(12) United States Patent
Au

(10) Patent No.: US 7,124,324 B1
(45) Date of Patent: Oct. 17, 2006

(54) METHOD OF TESTING FIBER CHANNEL PORTS IN A STORAGE SERVER AT FULL BANDWIDTH WITHOUT CONNECTION TO EXTERNAL DEVICES

(75) Inventor: Wing Y. Au, Sunnyvale, CA (US)

(73) Assignee: 3PARdata, Inc., Fremont, CA (US)

(*) Notice: Subject to any disclaimer, the term of this patent is extended or adjusted under 35 U.S.C. 154(b) by 981 days.

(21) Appl. No.: 10/226,762

(22) Filed: Aug. 22, 2002

(51) Int. Cl.
*G06F 11/00* (2006.01)

(52) U.S. Cl. .......................... 714/29; 714/28

(58) Field of Classification Search ............. 714/29, 714/28, 27, 716, 717; 710/31
See application file for complete search history.

(56) References Cited

U.S. PATENT DOCUMENTS

| | | | | |
|---|---|---|---|---|
| 5,136,590 A | * | 8/1992 | Polstra et al. | 714/29 |
| 6,038,618 A | * | 3/2000 | Beer et al. | 710/18 |
| 6,298,452 B1 | * | 10/2001 | Hill | 714/28 |
| 6,546,498 B1 | * | 4/2003 | Saegusa | 714/4 |
| 6,763,479 B1 | * | 7/2004 | Hebert | 714/4 |
| 6,766,466 B1 | * | 7/2004 | Jibbe | 714/4 |
| 6,832,186 B1 | * | 12/2004 | Margulieux | 703/24 |
| 7,000,149 B1 | * | 2/2006 | Chia et al. | 714/37 |
| 2003/0033563 A1 | * | 2/2003 | Cashman et al. | 714/43 |

* cited by examiner

*Primary Examiner*—Scott Baderman
*Assistant Examiner*—Joshua Lohn
(74) *Attorney, Agent, or Firm*—Patent Law Group LLP

(57) ABSTRACT

A data storage system includes a plurality of disk drives for data storage. A storage server controls the reading and writing of data to the disk drives. The storage server can be tested prior to connecting the disk drives and other components of the data storage system by connecting ports of the storage server to other ports of the storage server. One of the connected ports is changed from an initiator to a target to simulate a the target state of a disk drive. The server can test itself at normal data transfer rates using the initiator-target pair just as if it was testing a normal server/disk drive connection, but without having to test the actual disk drive and without having to detect or distinguish any problems that may exist with the disk drive and its connection, or other components that may be in the loop.

25 Claims, 5 Drawing Sheets

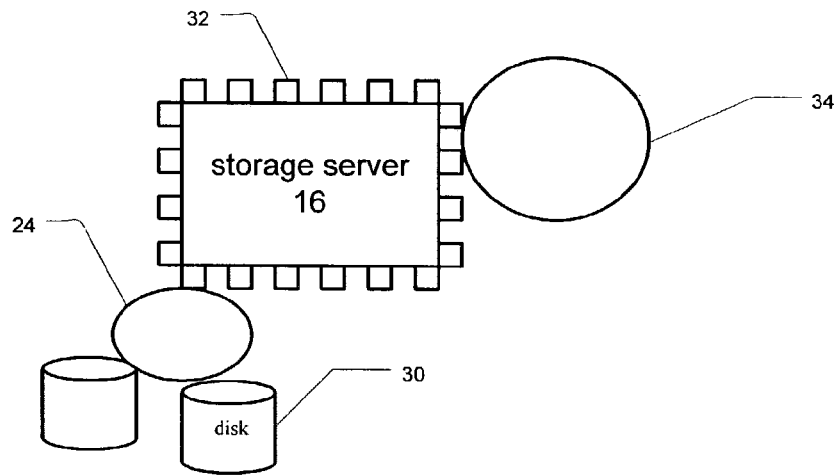
FIG. 3
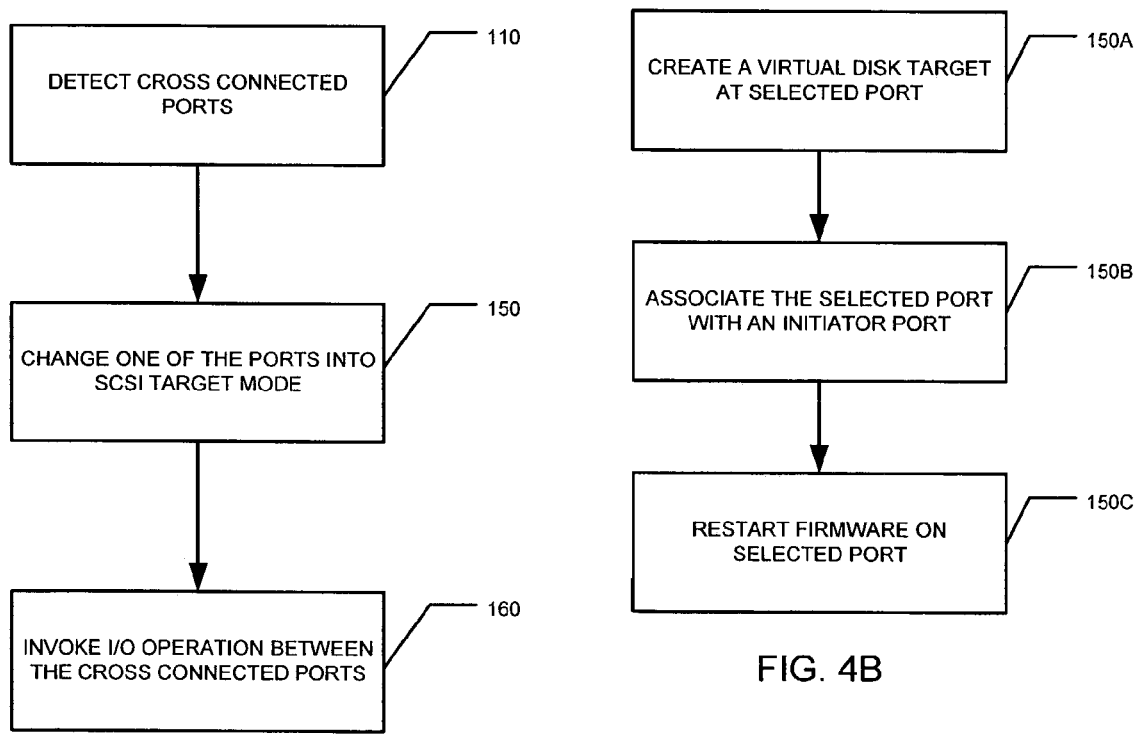
FIG. 4A
FIG. 4B

METHOD OF TESTING FIBER CHANNEL PORTS IN A STORAGE SERVER AT FULL BANDWIDTH WITHOUT CONNECTION TO EXTERNAL DEVICES

CROSS REFERENCE TO RELATED APPLICATIONS

This application is related to U.S. patent application Ser. No. 09/633,088 entitled "Data Storage System," and to U.S. patent application Ser. No. 09/751,649 entitled "Communication Link Protocol Optimized For Storage Architectures," which are hereby incorporated by this reference in their entirety.

BACKGROUND OF THE INVENTION

1. Field of the Invention

The present invention relates generally to the field of data storage and, more particularly, to testing components of a data storage system.

2. Related Art

In the context of computer systems, enterprise storage architectures provide mass electronic storage of large amounts of data and information. The frenetic pace of technological advances in computing and networking infrastructure—combined with the rapid, large-scale sociological changes in the way the way these technologies are used—has driven the transformation of enterprise storage architectures faster than perhaps any other aspect of computer systems. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage). Each of these storage architectures may serve a special niche, and thus may differ significantly in terms of functionality, performance, cost, availability, scalability and manageability.

Enterprise architectures may utilize disk storage systems to provide relatively inexpensive, non-volatile storage. The multiple disk drives of the data storage system are connected to a server computer (or "nodes") via a fibre channel network in one exemplary system. The nodes, the disk drives, and the network must all be tested before the data storage system can be sent to a customer for day to day use. This can be quite a complicated process to test the overall functionality of the data storage system, as well as the individual components of the system.

Prior testing methods included either 1.) connecting external devices to the fibre channel network and exercising it with the regular I/O interface, or 2.) connecting the fibre channel connection to a single port in a "loopback mode." Each of these methods has its drawbacks. Testing with external devices involves reading and writing to the devices and allows high bandwidth testing. However, when connected to external devices, any failure or reduced performance that is detected cannot be solely attributed to the fibre channel connection. It may be due to a problem in any of the connected devices. Tracking down the problem takes significant time and effort and makes an automated procedure extremely complicated if not impossible. Connecting the port in loopback mode requires the use of a special diagnostic interface that can only be exercised at low bandwidths. Loopback mode also does not allow high bandwidth multi-threaded communication and testing.

SUMMARY OF THE INVENTION

The testing method and system of the present invention allows both isolated testing of the network connection as well as high bandwidth testing. All of this is performed in an automated fashion requiring minimal operator intervention. The system therefore not only results in a more reliable test under realistic (high bandwidth) operating conditions, but also significantly reduces the amount of time required to test a system.

Other aspects and advantages of the present invention will become apparent from the following descriptions and accompanying drawings.

BRIEF DESCRIPTION OF THE FIGURES

For a more complete understanding of the present invention and for further features and advantages, reference is now made to the following description taken in conjunction with the accompanying drawings.

FIG. 3 is a block diagram for a storage server showing a test loop, according to an embodiment of the present invention.

FIG. 4A is a flow chart illustrating the general testing procedure, according to an embodiment of the present invention.

FIG. 4B is a flow chart illustrating conversion of port into target mode in step 150 of FIG. 4A, according to an embodiment of the present invention.

DETAILED DESCRIPTION

The system and method of testing components of the present invention can work with any networked computing system employing a fibre channel arbitrated loop. One such system that it will work with is described in order to provide the reader with an illustration of an environment for a data storage system where the invention would be particularly advantageous. It should, however, be understood that the invention is not limited to the particular environment and storage system described, but is widely applicable in many diverse environments.

Environment For a Data Storage System

Figure 1:
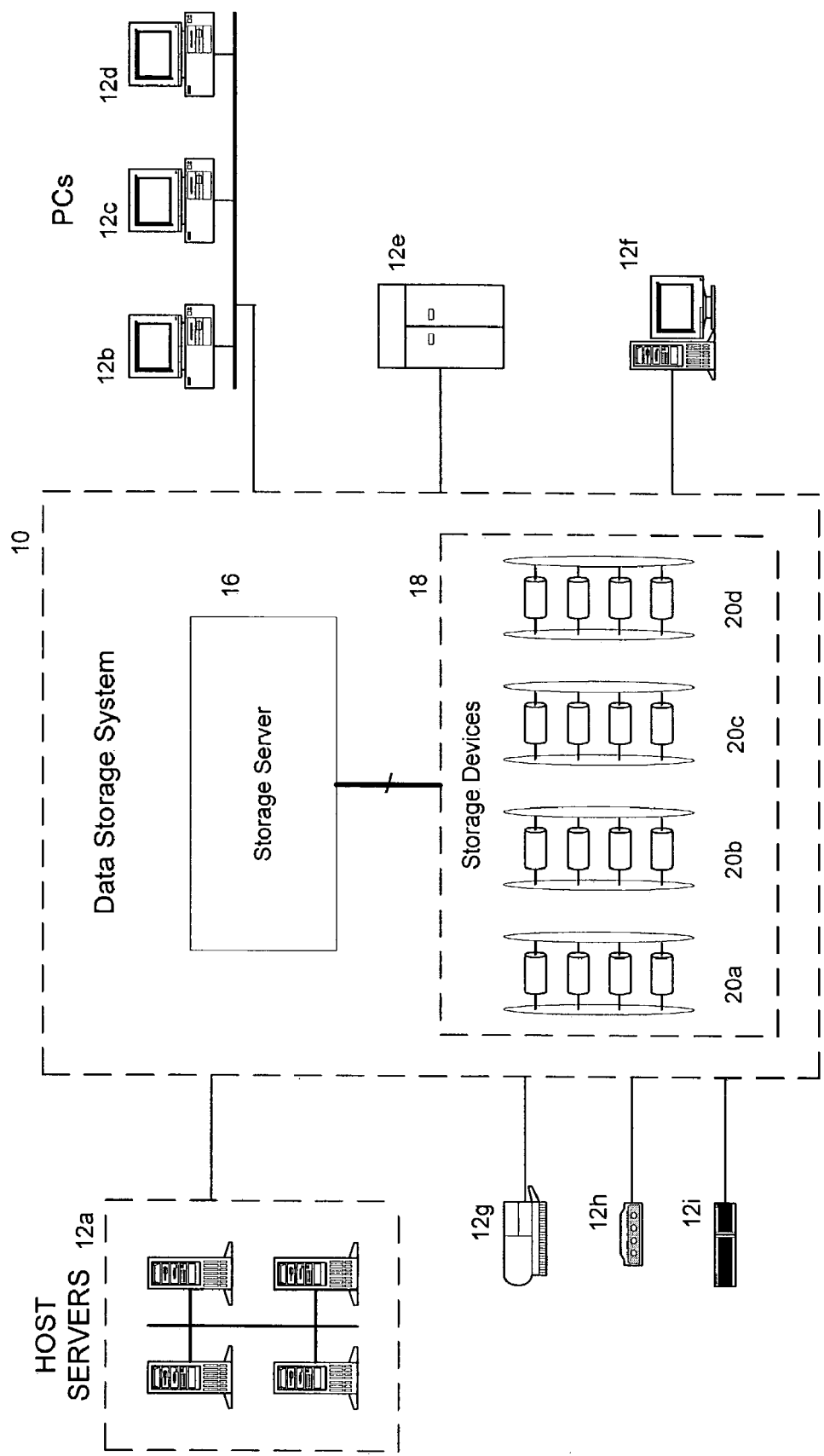
FIG. 1 illustrates an environment in which a data storage system according to an embodiment of the present invention may operate.

FIG. 1 illustrates an environment in which a data storage system 10 according to an embodiment of the present invention may operate. In general, data storage system 10 functions to provide mass storage for data and information routed, generated, manipulated, processed, or otherwise operated upon, by various host devices 12.

As depicted, these host devices 12 can include various processing devices, such as, for example, a server cluster 12a, one or more personal computers 12b, 12c, and 12d, a mainframe 12e, and a server tower 12f. Host devices 12 may also include various peripheral devices, such as, for example, a printer 12g, a modem 12h, and a router 12i. Each of these host devices 12 is connected to data storage system 10. As used herein, the terms "connected" or "coupled" mean any connection or coupling, either direct or indirect, between two or more elements; such connection or coupling can be physical or logical.

Data storage system 10 includes an interconnect component 16 and a storage component 18. Interconnect component 16 generally allows host devices 12 to store and retrieve information from storage component 18. In one embodiment, interconnect component 16 is a modular architecture that is readily scaled from one up to many computer access nodes. Each node may be associated with one or more particular storage devices in storage component 18.

Storage component 18 provides mass storage for data and information. Storage component 18 can be implemented with any suitable mass storage resource, such as tape or disk storage. In one embodiment, as shown, storage component 18 includes a number of storage devices 20, which are separately labeled 20a, 20b, 20c, and 20d. Each storage device 20 may be a JBOD (Just a Bunch of Disks) facility comprising a plurality of disk drives. The disk drives can be mounted in a rack-mountable storage shelf having one or more hot-pluggable disk drive sleds. Each sled may accommodate five or more disk drives on a pair of fibre channel (FC) connections. The sleds can be configured in one of two possible ways: (1) all sleds on the same redundant FC connections, or (2) half of the sleds on one set of redundant FC connections and the other half of the sleds on another set of redundant FC connections.

As further described herein, data storage system 10 implements or incorporates a scalable architecture particularly well suited for communication-intensive, highly available data storage, processing, or routing. This architecture may be used for a number of applications and can provide a high performance, highly available, scalable, flexible, and cost-effective storage array.

With the scalable architecture of data storage system 10, users (e.g., businesses) may begin with small configurations of data storage initially and later, when necessary, may expand to extremely large configurations. This expansion can be done without bringing down data storage system 10, changing system architectures, or drastically altering the basic infrastructure of the computing environment supported by data storage system 10.

Because of its flexibility and expandability, data storage system 10 can be used to consolidate the diverse storage requirements of a business. This eradicates static boundaries in data, thus enabling data resources to be readily shared and efficiently utilized. Furthermore, this eliminates or substantially reduces the inefficiency associated with training staff and management resources in the use and management of a multitude of data storage architectures.

Interconnect Component/Storage Server

Figure 2:
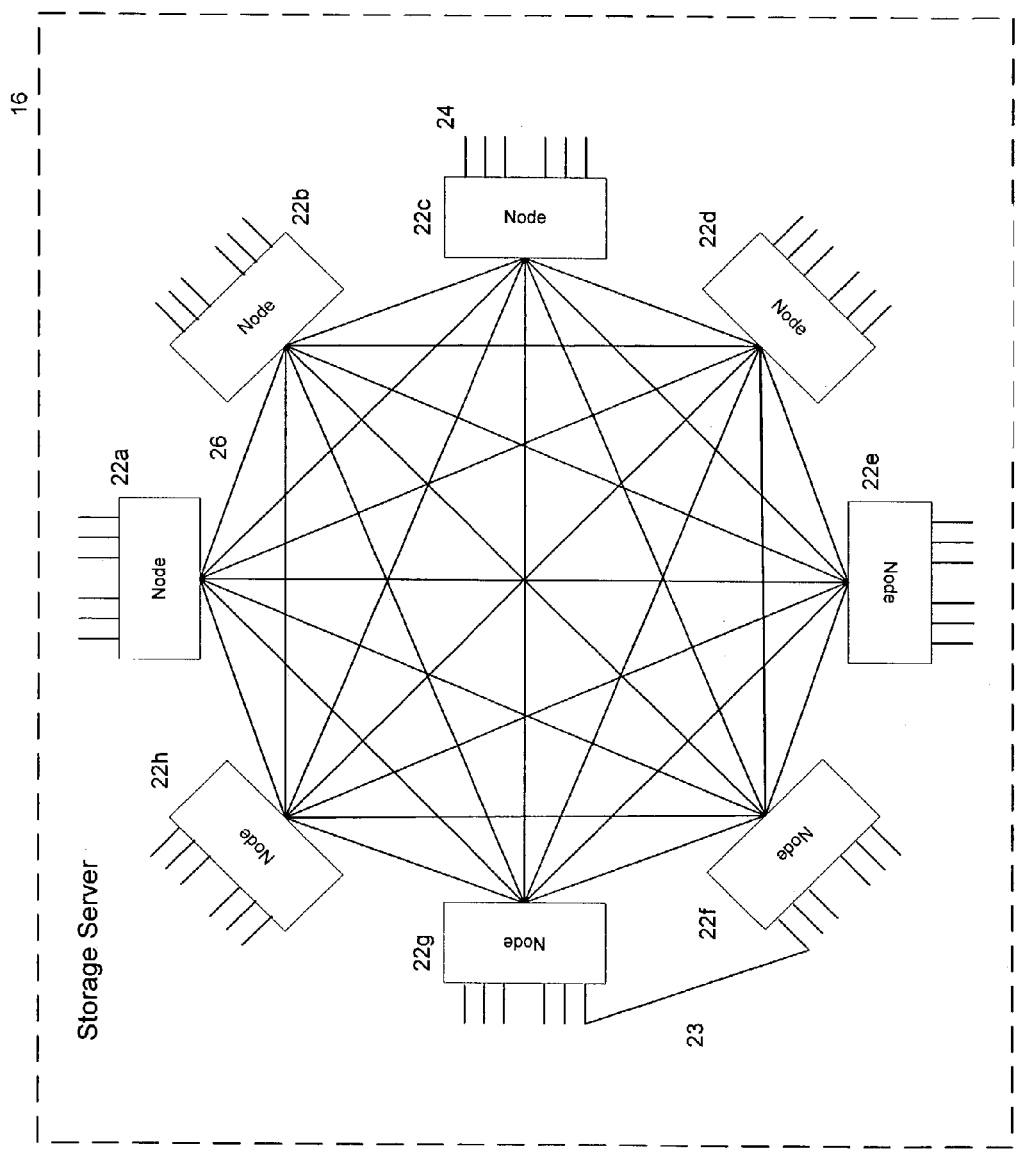
FIG. 2 is a block diagram for a storage server, according to an embodiment of the present invention.

FIG. 2 is a block diagram for interconnect component 16, according to an embodiment of the present invention. Interconnect component 16 may also be referred to as storage server 16. Storage server 16 may include a number of processing nodes 22 connected together by communication paths 26.

As depicted, nodes 22 are separately labeled as 22a, 22b, 22c, 22d, 22e, 22f, 22g, and 22h. Each node 22 generally functions as a point of interface/access for one or more host devices 12 and storage devices 20 (FIG. 1). For this purpose, in one embodiment, each node 22 may include one or more peripheral component interconnect (PCI) slots, each of which supports a respective connection 24. Each connection 24 can connect a host device 12 or a storage device 20. Connections 24 can be small computer system interface (SCSI), fibre channel (FC), fibre channel arbitrated loop (FCAL), Ethernet, Infiniband, or any other suitable connection.

In addition to communication paths 26, each node 22 may be connected to every other node 22 with a separate link 23. For clarity, only one link 23 is shown. These links 23 can be slower speed connections relative to communication paths 26. In one embodiment, each link 23 can be a serial connection supported by the PCI slots of the respective nodes 22. Each slower-speed link 23 provides or supports a "heartbeat" connection between the two respective nodes 22. As further described herein, such "heartbeat" connection allows each of the two respective nodes 22 to query the other node in order to determine if the other node has failed.

It is necessary to test these connections 24 and the devices that are connected with connections 24 in quality control procedures prior to shipping the data storage system to customers. An optimal test procedure will rapidly test the components of the data storage system in an automated fashion, under the conditions, loads, and transfer speeds of everyday operation, and will require minimal user interaction.

Testing of the Storage Server Ports and the FCAL Between the Storage Server and the Storage Components FIG. 3 is a simplified illustration of storage server 16, and FIG. 4A is a flow chart that should be viewed in tandem with FIG. 3. Storage server 16 has many ports 32, only one of which is labeled for simplicity. Storage server 16 is referred to as interconnect component 16 in other related applications that are incorporated by reference. Ports 32 of storage server 16 communicate to disk drives 30 over a fibre channel arbitrated loop (FCAL) 24 using FCAL protocol. In general operating mode, when the data storage system 10 (FIG. 1) is storing and retrieving data, the ports 32 that are connected to disk drives 30 are configured in SCSI initiator mode, and disk drives 30 are configured in SCSI target mode. In order to test the ports 32 and the overall functionality of the storage server 16, test loop 34 is connected to two ports 32 of storage server 16.

In step 110, as can be seen in FIG. 4A, the system scans the ports in order to detect one or more pairs of cross connected ports. In step 150, one of the ports 32 in test loop 34 that was originally in SCSI initiator mode is changed into SCSI target mode. The other port connected to test loop 34 remains in initiator mode. The "normal" initiator driver interface of the fibre channel adapter can therefore be used to send SCSI commands from the initiator port to the target port; and the target port can move data to or from the initiator port and send status information with the "normal" target driver interface in step 160.

To use the normal transaction interface of the fibre channel adapter normally requires access to external devices, such as a disk drive, host computer, or test equipment, which are connected to the FCAL. The present invention removes this requirement and greatly helps simplifying test configurations.

This is advantageous because the production or "normal" initiator and target drivers are used, therefore enabling multi-threaded operating system I/O operations. The regular I/O transactions with multi threaded operations occur at a relatively high bandwidth. Thus, the system can be tested at relatively high bandwidth with the present invention. Prior methods of testing a port by looping back the FCAL to the same port involved creating specialized testing routines where normal initiator-target operations, including transmission of regular I/O multithreaded transactions, were not possible. These loopback connections therefore only allowed testing at relatively low bandwidths, of, for example, roughly 40 MBps.

Another advantage of the present invention is rapid and more precise pinpointing of troublesome devices. Because a fibre channel port of the system is testing a (simulated) target within the same server, no external devices such as disk drives are in the loop. Therefore, external devices are not tested, and when a troubleshooting test is performed, if there is an error it can be localized within server 16. It is not necessary to spend time and effort chasing down problems that may or may not be present in any number of external devices. A test routine can rapidly and automatically test all of the ports 32 and FCALs 24 of server 16 at a typical operating bandwidth common to normal operations once the ports are properly connected. It should be understood that operating bandwidths generally tend to increase over time, and that the bandwidths described herein are only examples of current operating bandwidths that are expected to increase. The typical operating bandwidth is relatively high, about 200 MBps, when compared to the aforementioned loopback test bandwidth of about 40 MBps, and is the bandwidth that the FCAL loops normally operate at during regular data storage and retrieval operations. If a problem is detected during the automatic test routine, it will be clear that the problem is within the server and not a problem within external components, and the problem within the server can then be pinpointed.

Changing one of the ports into SCSI target mode in step 150 is a multi-step process. The keys steps of this operation are illustrated in FIG. 4B. In step 150A, a virtual disk is created at the port that is changed into target mode. Next, in step 150B the port changed into target mode is associated with a port 32 in initiator mode. After that, in step 150C, the firmware of the (selected) fibre channel port is changed into target mode is restarted.

Figure 5:
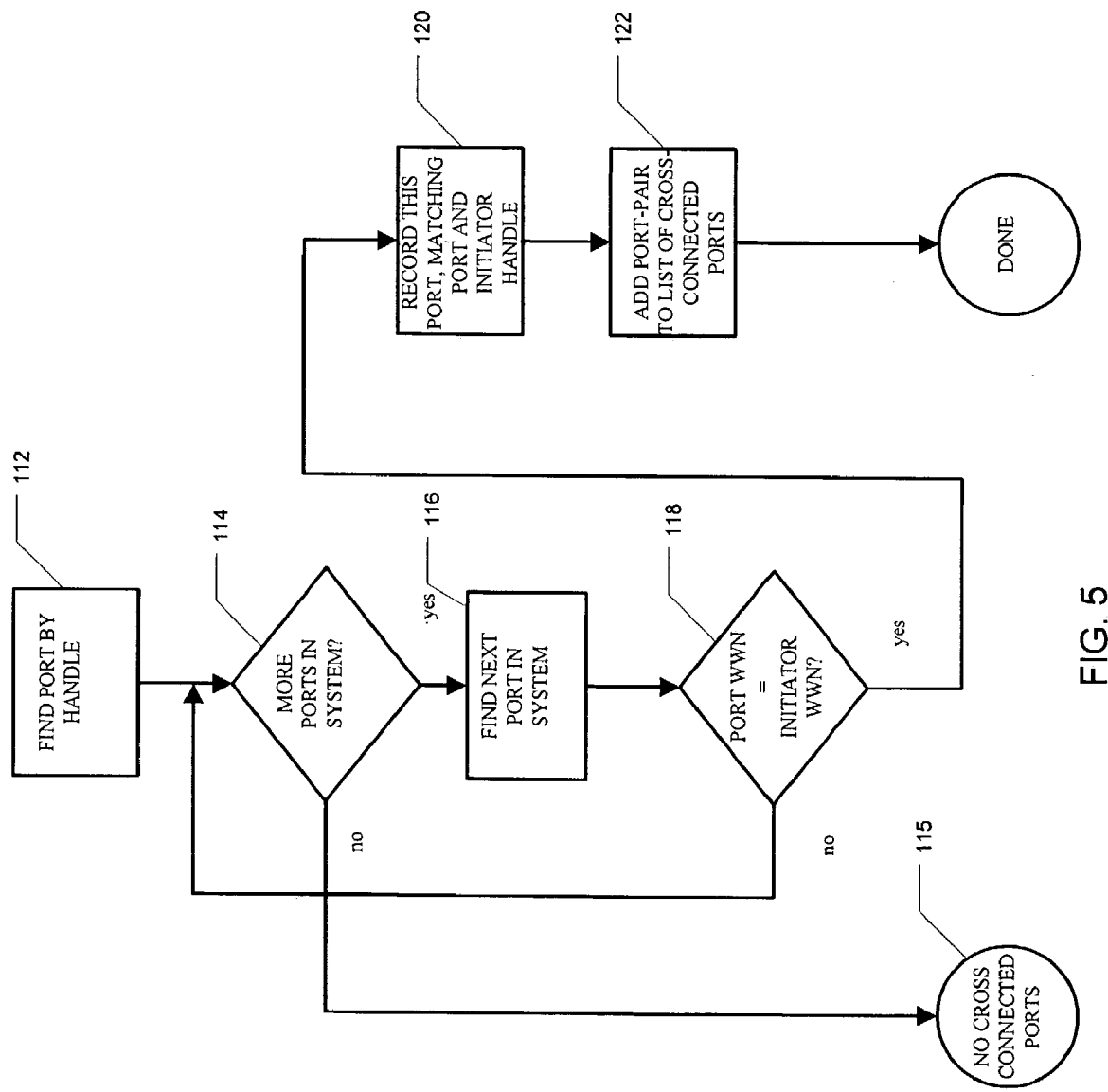
FIG. 5 is a flow chart illustrating detection and sorting of new and cross connected ports, according to an embodiment of the present invention.
Figure 6:
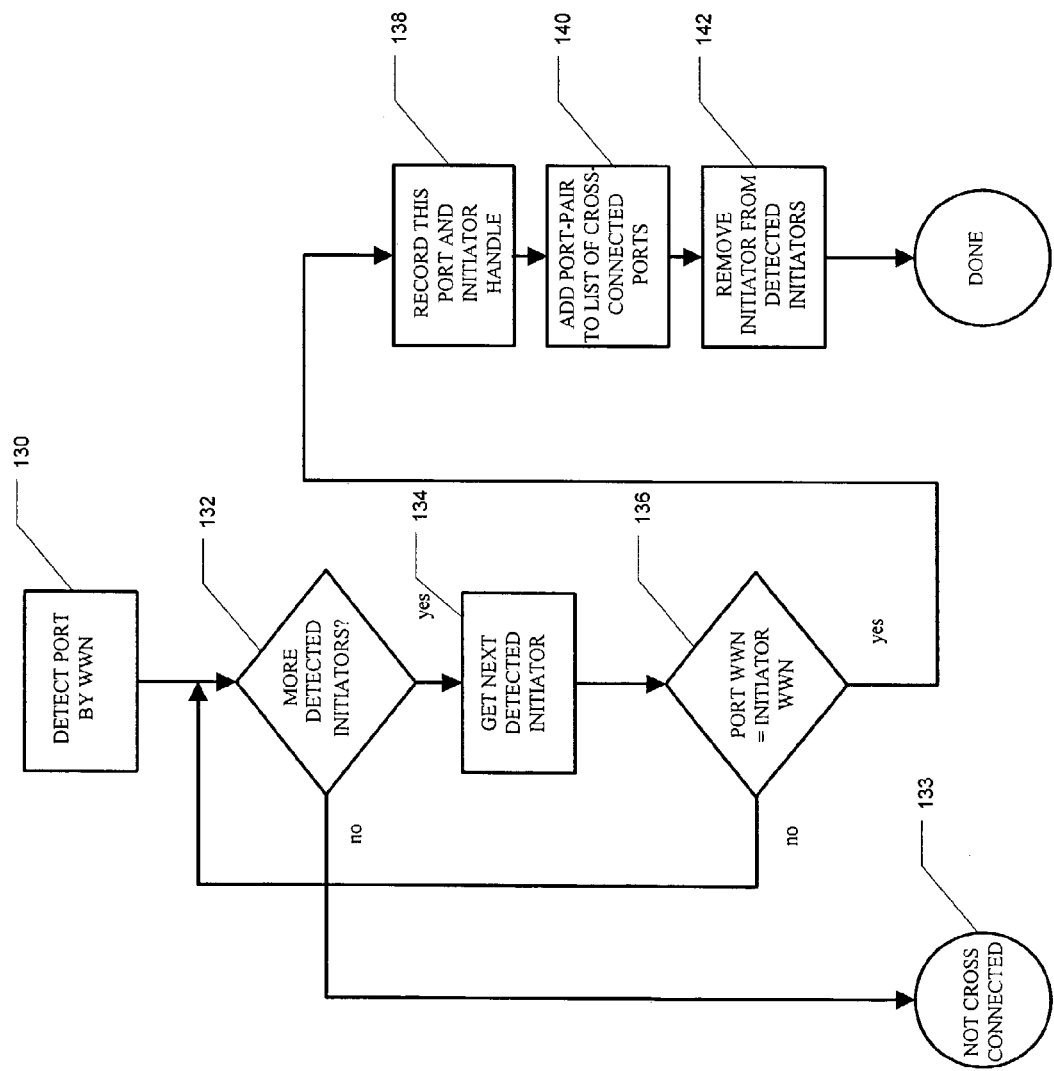
FIG. 6 is a flow chart illustrating detection and sorting of initiators and cross connected ports, according to an embodiment of the present invention.

The testing operations will be described in further detail with regards to the flow charts of FIGS. 5 and 6. FIGS. 5 and 6 show the processes involved in step 110 of FIG. 4A in more detail. There are two levels of software running in the storage server 16: an operating system kernel level that controls the individual fibre channel adapters and a user level program that controls data storage system 10. When the data storage system starts up, the kernel collects all the fibre channel ports and SCSI initiators detected. Ports that are cross-connected will be detected by the kernel as SCSI initiators. The kernel passes a series of messages to the user level program, one for each new port detected and each new initiator detected. The user level program runs through an algorithm to sort out the cross-connected ports and maintains a database of port-pairs.

FIG. 5 illustrates detection of a new port. In step 112, the system finds the name of a port by its handle. Each port has a handle. A handle is a software pointer to a data structure in the software. The data structures are created by data storage system 10, and in particular storage server 16. The address of the memory space used by the data structure is the handle.

In step 114 the system scans for additional ports. If no additional ports are found in step 114 there can be no cross connected ports as shown in step 115. If additional ports are found in step 114 the system will scan for the next port in step 116. In step 118 the system will check if the world wide name ("WWN") of the port that was found in step 116 matches a WWN of a list of initiator ports. A WWN is a value, generally a 64 bit unique identifier, that is uniquely assigned to a fibre channel port in the system. A WWN is similar to an Ethernet address, which is a numeric value hard-coded into the port. Each host 12 also has its own WWN. If it does not match, the system will return to step 114 and search for additional ports. If it does match, then the system will record the port WWN, the matching port, and the initiator handle in step 120. In step 122, the system will add the port-pair to a list of cross connected ports.

FIG. 6 illustrates the detecting of ports in initiator mode. These ports can be in initiators such as host computers 12, or may be ports of storage server 16 that have been changed into initiator mode. In step 130 the system detects a port through its WWN. Each port has a hard-coded WWN associated with it. For each port in the system that is discovered, a data structure is created to represent that port. In step 132 the system searches for more ports in initiator mode. If no more ports in initiator mode are found, the system cannot cross connect the port found in step 130 as seen in step 133. If another port in initiator mode is found in step 132 the system searches again for another port in initiator mode in step 134. In step 136 the system will determine if the WWN of the port detected in step 134 matches the WWN of a known list of initiator ports. If it does not the system will return to step 132. If there is a match, the system will record this port name and initiator handle in step 138. In step 140 the port-pair will be added to a list of cross connected ports. The initiator added as a port pair will then be removed from the list of detected initiators in step 142.

To instruct a port within a cross-connected pair to change its behavior into target mode, the user level program sends a series of messages to the kernel. First, the kernel is instructed to create a virtual disk at the port. Second, the kernel is instructed to create an association between an initiator and the virtual disk target created. Third, the kernel is instructed to restart the firmware on the fibre channel adapter containing the target port using the port handles and initiator handles as shown in FIG. 4B.

After the kernel changes a port into target mode, two events will happen to the partner port. Initially, the initiator will disappear and a target will appear in its place. These events will cause the kernel to send two messages to the user level program, one for the initiator disappearing one for the target appearing. The user level program will search through its list of cross connected pairs to record the changes. After the transformation into a an initiator-target combination is completed, the user level program sends a message to the kernel to activate a device file that corresponds to the cross connected ports.

This invention simultaneously provides high bandwidth testing and configuration simplicity. The previous methods each provided either one or the other of the features. While embodiments of the present invention have been shown and described, changes and modifications to these illustrative embodiments can be made without departing from the present invention in its broader aspects. Thus, it should be evident that there are other embodiments of this invention which, while not expressly described above, are within the scope of the present invention and therefore that the scope of the invention is not limited merely to the illustrative embodiments presented. Therefore, it will be understood that the appended claims set out the metes and bounds of the invention. However, as words are an imperfect way of describing the scope of the invention, it should also be understood that equivalent structures and methods while not within the express words of the claims are also within the true scope of the invention.

The invention claimed is:

1. A method of testing a data connection between two ports of a data storage system including a storage server, the method comprising:
   connecting a port of the storage server to another port of the storage server;
   detecting the connected ports of the storage server;
   changing one of the connected ports into target mode operation, wherein said changing one of the connected ports comprises creating a virtual disk at the port changed into target mode operation; and
   transferring data between the connected ports, thereby simulating normal operation of the data storage system.

2. The method of claim 1, wherein said changing one of the connected ports further comprises associating one of the connected ports in initiator mode operation with the port changed into target mode operation.

3. The method of claim 1, further comprising restarting firmware controlling a data network containing the connected ports.

4. The method of claim 3, wherein the port changed into target mode operation is restarted.

5. The method of claim 1, wherein said transferring data between the connected ports comprises transferring data at about a data transfer speed of the data connection in data storage operations.

6. The method of claim 1, wherein said detecting the connected ports comprises querying names of all ports of the data storage system and associating the names of the connected ports.

7. The method of claim 1, wherein said transferring data between the connected ports comprises:
   sending a read command from one of the connected ports to the port changed into target mode operation; and
   sending data from the port changed into target mode operation to the port connected to it.

8. A method of testing a data storage system having a fibre channel connection, comprising:
   connecting a first fibre channel port to a second fibre channel port, the first and second fibre channel ports normally configured in initiator mode;
   changing the second fibre channel port into target mode, wherein said changing the second fibre channel port comprises creating a virtual disk at the second fibre channel port; and thereafter
   transmitting data between the first fibre channel port in initiator mode and second fibre channel in target mode, thereby simulating normal operation of the data storage system.

9. The method of claim 8, wherein said transmitting data occurs at normal data transmission speed between a disk drive and a server.

10. The method of claim 9, wherein the normal data transmission speed is about a maximum data transmission rate of the fibre channel connection.

11. The method of claim 9, wherein the normal data transmission speed is about 200 MBps.

12. The method of claim 8, wherein said changing the second fibre channel port into target mode further comprises associating the virtual disk at the second fibre channel port with the first fibre channel port in initiator mode.

13. The method of claim 12, further comprising restarting the fibre channel connection.

14. The method of claim 12, wherein said associating the virtual disk comprises reading world wide names of the first and the second fibre channel ports and pairing the worldwide names.

15. The method of claim 8, wherein said transmitting data comprises sending a read command from the first fibre channel port to the second fibre channel port.

16. The method of claim 8, wherein said transmitting data comprises sending a write command from the first fibre channel port to the second fibre channel port.

17. The method of claim 16, wherein the write command causes the first fibre channel port to send data to the second fibre channel port.

18. A data storage system, comprising:
   a plurality of disk drives each having a port normally configured to run in target mode;
   a storage server comprising multiple ports normally configured to run in target or initiator mode, the storage server operable to change one or more of the ports normally configured to run in initiator mode to target mode, the storage server operable to transfer data between one port in initiator mode and another port in target mode to simulate normal operation of the data storage system;
   wherein changing one or more of the ports normally configured to run in initiator mode to target mode comprises creating one or more virtual disks at the one or more of the ports normally configured to run in initiator mode.

19. The data storage system of claim 18, further comprising a host computer comprising one or more ports, the host computer ports operating in initiator mode, the one or more changed ports emulating the one or more host computer ports.

20. A data storage system comprising a storage server, the storage server comprising a plurality of ports normally configured to run in initiator mode, the storage server operable to test the plurality of ports normally configured to run in initiator mode by changing one or more of the ports to target mode and transferring data between one of the ports changed to target mode and a selected port of the storage server in initiator mode to simulate normal operation of the data storage system, wherein said changing one or more of the ports to target mode comprises creating one or more virtual disks at the one or more of the ports being changed to target mode.

21. A data storage system, comprising:
   a plurality of disk drives each having a port normally configured to run in target mode;
   a means for testing a storage server and connections from the storage server to the plurality of disk drives at or near full bandwidth without connecting to the plurality of disk drives, wherein the means comprises:
      changing a first port of the storage server from an initiator mode to a target mode, said changing comprises creating a virtual disk at the first port;
   connecting a second port of the storage server to the first port and transferring data between the first and the second ports to simulate normal operation of the data storage system.

22. The data storage system of claim 21, wherein the means for testing avoids testing the plurality of disk drives or other components.

23. A data storage system, comprising:
   a group of disk drives having ports configured to run in target mode during data storage operations;

a server having ports configured to run in initiator mode during data storage operations, the server configured to test the ports of the server by changing one or more of the ports to target mode to emulate one of the group of disk drives, the server configured to transfer data between one port in initiator mode and another port in target mode to simulate normal operation of the data storage system;

wherein said changing one or more of the ports to target mode comprises creating one or more virtual disks at the one or more of the ports.

24. The data storage system of claim 23 wherein the server is configured to test the connected initiator port and target port of the server at about a full data transfer rate of a connector between the target port and initiator port.

25. The data storage system of claim 24, wherein the connector comprises a fibre channel and the full data transfer rate is about 200 MBps.

* * * * *